US012529643B2

(12) United States Patent
Gingras et al.

(10) Patent No.: US 12,529,643 B2
(45) Date of Patent: Jan. 20, 2026

(54) SYSTEM AND METHOD FOR AUTOMATIC GATING IN FLOW CYTOMETRY

(71) Applicant: CELLCARTA FREMONT LLC, Fremont, CA (US)

(72) Inventors: Olivier Gingras, Montréal (CA); Zach Bjornson-Hooper, San Francisco, CA (US)

(73) Assignee: CELLCARTA FREMONT LLC, Fremont, CA (US)

( * ) Notice: Subject to any disclaimer, the term of this patent is extended or adjusted under 35 U.S.C. 154(b) by 199 days.

(21) Appl. No.: 18/051,056

(22) Filed: Oct. 31, 2022

(65) Prior Publication Data

US 2024/0142367 A1    May 2, 2024

(51) Int. Cl.
| | |
|---|---|
| G06T 11/20 | (2006.01) |
| G01N 15/1429 | (2024.01) |
| G06T 3/00 | (2006.01) |
| G06T 7/30 | (2017.01) |
| G01N 15/10 | (2006.01) |
| G01N 15/14 | (2006.01) |

(52) U.S. Cl.
CPC ......... *G01N 15/1429* (2013.01); *G06T 3/00* (2013.01); *G06T 7/30* (2017.01); *G06T 11/206* (2013.01); *G01N 2015/1006* (2013.01); *G01N 2015/1402* (2013.01); *G06T 2207/20081* (2013.01); *G06T 2207/30024* (2013.01); *G06T 2210/41* (2013.01); *G06T 2210/44* (2013.01)

(58) Field of Classification Search
None
See application file for complete search history.

(56) References Cited

U.S. PATENT DOCUMENTS

| | | | |
|---|---|---|---|
| 9,488,639 B2 | 11/2016 | Lange et al. | |
| 9,934,364 B1 | 4/2018 | Kumar et al. | |
| (Continued) | | | |

FOREIGN PATENT DOCUMENTS

| | | | |
|---|---|---|---|
| WO | 0145046 A1 | 6/2001 | |
| WO | 2021191908 A1 | 9/2021 | |

OTHER PUBLICATIONS

Ulrike Naumann et al., The curvHDR method for gating flow cytometry samples, BMC Bioinformatics, Dec. 31, 2010, 13 pages.
(Continued)

*Primary Examiner* — Yi Wang
(74) *Attorney, Agent, or Firm* — MH2 Technology Law Group, LLP (57) ABSTRACT

A method for automatically adjusting gates to cytometry data of a target sample is provided. The method includes receiving training cytometry data corresponding to a plurality of training samples; generating an image of the target sample, generating images of the plurality of training samples; selecting a training sample from the plurality of training samples based on a similarity between the image of the selected training sample and the image of the target sample; calculating a transformation required to morph between the image of the selected training sample and the image of the target sample; and generating a target sample gate by applying the calculated transformation to the training gate associated with the selected training sample. A corresponding system and computer-readable medium are also provided.

21 Claims, 7 Drawing Sheets

(56) References Cited

U.S. PATENT DOCUMENTS

| | | |
|---|---|---|
| 10,593,082 B2 | 3/2020 | Crespo-Diaz et al. |
| 10,803,637 B2 | 10/2020 | Fainshtein et al. |
| 2008/0232714 A1 | 9/2008 | Nord et al. |
| 2016/0169786 A1 | 6/2016 | Albitar et al. |
| 2020/0105376 A1 | 4/2020 | Lai et al. |
| 2020/0396397 A1 | 12/2020 | Hayes et al. |
| 2021/0278333 A1 | 9/2021 | Irvine et al. |
| 2021/0303818 A1 | 9/2021 | Randolph et al. |
| 2022/0012362 A1* | 1/2022 | Kuta .................. G06V 10/758 |

OTHER PUBLICATIONS

Guenther Walther et al., Automatic Clustering of Flow Cytometry Data with Density-Based Merging, Dec. 31, 2009, Advances in Bioinformatics, vol. 2009, 7 pages.

Hunjoong Lee et al., High-Throughput Analysis of Clinical Flow Cytometry Data by Automated Gating, Apr. 30, 2019, Bioinformatics and Biology Insights, vol. 13, 9 pages.

Young Jin Heo, Real-time Image Processing for Microscopy-based Label-free Imaging Flow Cytometry in a Microfluidic Chip, Sep. 14, 2017, Science Reports, vol. 7, 9 pages.

T. Matos (Authorized Officer), International Search Report and Written Opinion mailed in PCT/US2023/036269 on Feb. 15, 2024, 12 pages.

\* cited by examiner

SYSTEM AND METHOD FOR AUTOMATIC GATING IN FLOW CYTOMETRY

TECHNICAL FIELD

The technical field generally relates to cytometry, and more specifically to systems and methods to allow automatic gating during analysis of cytometry data.

BACKGROUND

Flow cytometry is a technique for determining the characteristics, functions, and properties of a multitude of different cells or particles within a fluid sample. This may be done via detection of specific surface or intracellular markers (e.g., proteins) or determination of cell counts, viability, and morphology (e.g., size/granularity). Flow cytometry often involves the use of fluorescent labels (e.g., fluorophore) or quantum dots, but may also involve the use isotope or metal labels, such as in mass cytometry (e.g., cytometry by time of flight [CyTOF]), for the detection specific markers. These labels are often conjugated to antibodies which specifically bind to markers on the cells or particles. Cells or particles are transported within the flow cytometer and individually irradiated with light. Scattering patterns of the light on the cells correspond to different characteristics and properties of different cells (e.g., cell size and granularity), which is subsequently measured. Furthermore, flow cytometers and mass cytometers include sensors or detectors for detecting each specific label present on a cell or particle. For example, spectrally distinct fluorescent labels on cells may be excited by one or more lasers in a flow cytometer, and subsequent signals may be then analyzed. Signals from light captured by different lasers and emitted at different wavelengths is then digitized and processed to be saved for analysis. In a mass cytometer, cells are nebulized and sent through an argon plasma, which ionizes metal labels. The metal signals are then analyzed by a mass spectrometer.

Data obtained from cytometers can then be stored on a computer and then analyzed using different software. In most cases, the data is displayed in multidimensional plots. One-dimensional plots may include histograms, which may be displayed as histograms demonstrating mean fluorescence intensity (MFI) of a given label. Two- or three-dimensional plots may include different types of scatter or dot plots of two or three parameters/channels (on each axis), such as forward scatter (FSC), side-scatter (SSC), or any specific label. Within these plots, populations or clusters of cells may be identified by manually gating around the clusters and further displayed onto an additional plot having different parameters. Gating is often used to identify specific cell populations and determining expression levels of markers on said populations. Creating and modifying gates for each sample or experiment, especially in the context of complex samples and samples labelled with a multitude of different labels, may be tedious and time consuming, and in some cases may increase intra- or inter-experimental variability of the data analyzed. Therefore, there is a need for a method or process for automating the creation and modification of gates.

SUMMARY

According to an aspect, a method is provided for automatically adjusting gates to cytometry data of a target sample. The method includes: receiving training cytometry data corresponding to a plurality of training samples, the training cytometry data comprising, for each training sample, a plurality of data points and at least one training gate isolating at least one population of the data points; generating an image of the data points for the target sample; generating images of the data points for the plurality of training samples; selecting a training sample from the plurality of training samples based on a similarity between the image of the selected training sample and the image of the target sample; calculating a transformation required to morph between the image of the selected training sample and the image of the target sample; and generating a target sample gate by applying the calculated transformation to the training gate associated with the selected training sample.

In an embodiment, the image of the datapoints is generated by a sequence of steps comprised of any or all of 2D histogram binning, saturating the image based on a percentile of the pixel intensities, Gaussian blurring and local density normalization.

In an embodiment, the image of the datapoints is comprised of additional channels that reflect those other than the ones used for histogram binning, and their pixel values summarize the intensity of each additional channel for the cells in each histogram bin using a mathematical summary metric obtained by arithmetic mean, median, geometric mean, singular value decomposition or principle component analysis.

In an embodiment, the training sample is selected from the plurality of training samples using a nearest-neighbor search of the image pixel data.

In an embodiment, the transformation uses a non-rigid, deformable registration algorithm.

In an embodiment, the transformation is based on Thirion's "demons" algorithm and produces a transformation field.

In an embodiment, the magnitude and direction of the image gradient of multiple channels is calculated by taking the square root or direction, respectively, of the largest eigenvalue of $J^T J$, where J is the Jacobian matrix comprised of the gradients of each channel.

In an embodiment, the user can specify the smoothing applied to the transformation field during each iteration of the algorithm.

In an embodiment, the transformation is based on the finite-element method.

In an embodiment, the gate is only transformed if the improvement in correlation between the target and training sample exceeds a user-defined amount; and otherwise the gate geometry is copied without transformation from the training sample.

In an embodiment, gates are only adjusted if there are at least a user-defined number of cells in the plot; and otherwise the gate geometry is copied without adjustment from the most similar training sample.

In an embodiment, gates that the user requests to adjust simultaneously are further adjusted after transformation to correct for overlaps between gates.

In an embodiment, the gate geometry is adjusted to keep vertices that are outside of the plot display range before adjustment, outside of the plot display range after adjustment.

In an embodiment, additional vertices are added to polygon gates to allow for higher-resolution transformations.

In an embodiment, a score is produced indicating the improvement effected by the transformation.

In an embodiment, the score is the relative improvement in the correlation between the training and target images after transformation.

In an embodiment, user-defined or automatically defined landmarks can be added to guide the image registration.

In an embodiment, ellipse gates are adjusted by sampling points along the edge of the original ellipse, the points are transformed according to the image transformation, and then a bounding ellipse is fit to the points.

In an embodiment, rectangle gates are adjusted by sampling a series of points on each edge of the rectangle, transforming the points according to the image transformation, and taking the average x or y of each vertical or horizontal edge's points, respectively, weighted by the density at each point.

In an embodiment, quadrant gates with right-angles are adjusted by sampling a series of points on each edge, transforming the points according to the image transformation, and taking the average of each line's points, weighted by the density at each point.

In an embodiment, quadrant gates with non-right angles are adjusted by sampling points along each edge of the quadrant gate; the edge points and center point are transformed according to the image transformation; lines through the sampled edge points and the transformed center point and its neighbors are constructed; and finally the quadrant lines that intersects with the fewest events (cells in pixels) are selected.

In an embodiment, one-dimensional histogram range and split gates are adjusted by performing the method in claim 1 with both X and Y axes representing the one-dimensional channel.

In an embodiment, many target samples are processed in parallel.

In an embodiment, target samples are grouped according to user input and processed by group, yielding identical gate geometry for all samples within a group.

In an embodiment, gates using the same axes and parent population are processed in parallel.

In an embodiment, a hierarchy of gates are processed in hierarchical order.

In an embodiment, the process can be performed as a cycle, alternating between the process described above, and manual review and adjustment of gate geometry, incorporating the manual adjustments into the training repertoire in the next application of the process.

According to an aspect, a system is provided. The system includes a processor and memory, the memory storing instruction which, when executed, cause the processor to carry out a method for automatically adjusting gates to cytometry data of a target sample, the method including: receiving training cytometry data corresponding to a plurality of training samples, the training cytometry data comprising, for each training sample, a plurality of data points and at least one training gate isolating at least one population of the data points; generating an image of the data points for the target sample; generating images of the data points for the plurality of training samples; selecting a training sample from the plurality of training samples based on a similarity between the image of the selected training sample and the image of the target sample; calculating a transformation required to morph between the image of the selected training sample and the image of the target sample; and generating a target sample gate by applying the calculated transformation to the training gate associated with the selected training sample.

According to an aspect, a non-transitory computer-readable medium is provided. The non-transitory computer readable medium has instructions stored thereon which, when executed, cause a processor to carry out a method for automatically adjusting gates to cytometry data of a target sample, the method including: receiving training cytometry data corresponding to a plurality of training samples, the training cytometry data comprising, for each training sample, a plurality of data points and at least one training gate isolating at least one population of the data points; generating an image of the data points for the target sample; generating images of the data points for the plurality of training samples; selecting a training sample from the plurality of training samples based on a similarity between the image of the selected training sample and the image of the target sample; calculating a transformation required to morph between the image of the selected training sample and the image of the target sample; and generating a target sample gate by applying the calculated transformation to the training gate associated with the selected training sample

BRIEF DESCRIPTION OF THE DRAWINGS

Other aspects, advantages and features of the present description will become more apparent upon reading of the following non-restrictive description of specific embodiments thereof, given by way of example only with reference to the accompanying drawings, in which.

DETAILED DESCRIPTION

Headings, and other identifiers, e.g., (a), (b), (i), (ii), etc., are presented merely for ease of reading the specification and claims. The use of headings or other identifiers in the specification or claims does not necessarily require the steps or elements be performed in alphabetical or numerical order or the order in which they are presented.

The use of the word "a" or "an" when used in conjunction with the term "comprising" in the claims and/or the specification may mean "one" but it is also consistent with the meaning of "one or more", "at least one", and "one or more than one".

The term "about", when used herein, indicates that a value includes the standard deviation of error for the device or method being employed in order to determine the value. In general, the terminology "about" is meant to designate a possible variation of up to 10%. Therefore, a variation of 1, 2, 3, 4, 5, 6, 7, 8, 9 and 10% of a value is included in the term "about". Unless indicated otherwise, use of the term "about" before a range applies to both ends of the range.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the term "flow cytometry" or "flow cytometry data" may refer to data comprising traditional flow cytometry gating techniques, such as for example, data obtained from any flow cytometer or sorter (e.g., Fluorescence-activated Cell Sorting [FACS]), scanning cytometer, or mass cytometer (e.g., Cytometry by time of flight [CyTOF]). These data may be included in file types such as .fcs files and may be viewed/analyzed using any traditional flow cytometry or mass cytometry software.

As used herein, "sample" or "biological sample" refers to any sample being suitable for testing via a flow cytometer or mass cytometer. The sample may comprise cells or particles, such as biological particles (e.g., cell fragments, exosomes, liposomes, platelets, or microparticles). Samples can include but are not limited to cellular extracts, extracellular fluid, fluid harvested from the body of a subject, culture media, blood, bone marrow, plasma, serum, biopsy, or any organ.

One or more systems described herein may be implemented in computer program(s) executed on processing device(s), each comprising at least one processor, a data storage system (including volatile and/or non-volatile memory and/or storage elements), and optionally at least one input and/or output device. "Processing devices" encompass computers, servers and/or specialized electronic devices which receive, process and/or transmit data. As an example, "processing devices" can include processing means, such as microcontrollers, microprocessors, and/or CPUs, or be implemented on FPGAs. For example, and without limitation, a processing device may be a programmable logic unit, a mainframe computer, a server, a personal computer, a cloud-based program or system, a laptop, a personal data assistant, a cellular telephone, a smartphone, a wearable device, a tablet, a video game console, or a portable video game device.

Each computer program can be implemented in a high-level programming and/or scripting language, for instance an imperative e.g., procedural, or object-oriented, or a declarative e.g., functional or logic, language, to communicate with a computer system. However, a program can be implemented in assembly or machine language if desired. In any case, the language may be a compiled or an interpreted language. Each such computer program can be stored on a storage media or a device readable by a general or special purpose programmable computer for configuring and operating the computer when the storage media or device is read by the computer to perform the procedures described herein. In some embodiments, the system can be embedded within an operating system running on the programmable computer.

Furthermore, the system, processes and methods of the described embodiments are capable of being embodied in a computer program product comprising a computer-readable medium having computer-usable instructions which, when executed, cause one or more processors to implement the system and/or carry out steps of the processes and methods. The computer-usable instructions can be in various forms including compiled and non-compiled code.

The processor(s) can be used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, diskettes, compact disks, tapes, chips, as examples only. The type of memory can be chosen according to the desired use, whether it should retain instructions, or temporarily store, retain or update data. Steps of the proposed method can be implemented as software instructions and algorithms, stored in computer memory and executed by processors.

Figure 1:
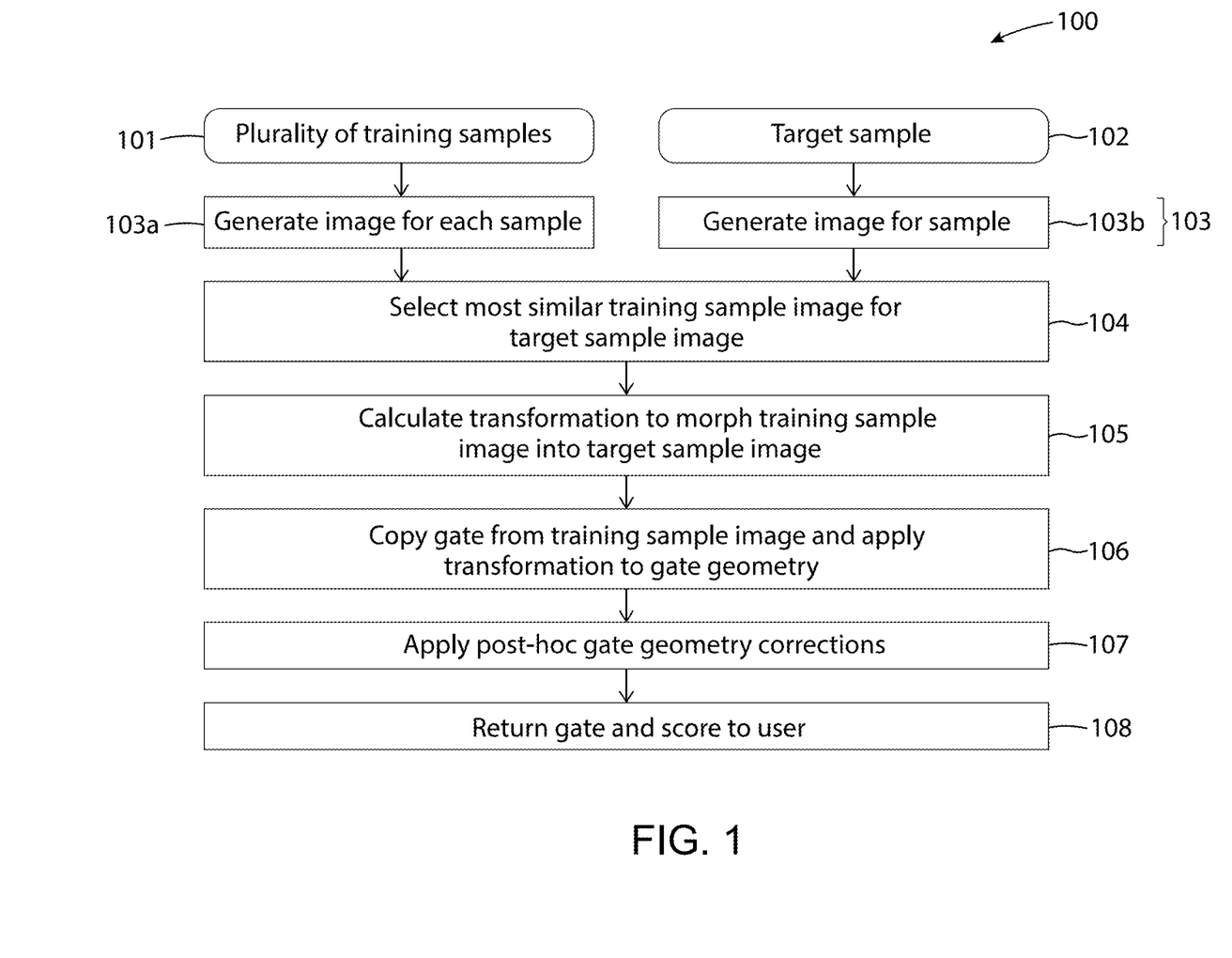
FIG. 1 is a flowchart illustrating a method for automatic gating in flow cytometry, according to an embodiment.

With reference to FIG. 1, an exemplary method 100 for automatic gating in cytometry is shown according to an embodiment. The method will be described in connecting with flow cytometry, but it is appreciated that the same method and corresponding principles can also apply to mass cytometry and other processes that involve processing data in a similar manner. In the illustrated embodiment, a first step can include providing a training dataset comprising training flow cytometry data corresponding to a plurality of training samples 101. The training flow cytometry data can comprise, for each training sample, a plurality of data points and at least one training gate isolating at least one population of the datapoints.

As can be appreciated, a training sample can correspond to a sample that was previously tested/analyzed via a flow cytometry process. The training flow cytometry data can include data points corresponding to measurements of the training sample as acquired via a flow cytometer. Each data point can correspond to measurements of an individual cell/particle that has passed through the one or more lasers of the flow cytometer. Such data points can be provided in a data file and/or table, and can be plotted for visualization/analysis, for example on a one- or two-dimensional histogram, and/or two- or three-dimensional dot or scatter plots.

The training flow cytometry data includes one or more gates isolating populations of datapoints. Such gates can correspond to one-, two- or three-dimensional shapes drawn on, or in association with, the plots of the data points in order to logically group, isolate and/or distinguish one or more subsets of the data points from the remaining datapoints. For example, where the data points are plotted on a one-dimensional histogram, a gate can correspond to a specified range on the histogram and/or a point where the histogram can be split. Data points falling within the range specified by the gate, or a section of the histogram split by the gate, can be considered as being grouped as part of the same population. Where data points are plotted on a two- or three-dimensional dot or scatter plot, the gate can correspond to a closed shape drawn on the plot, such that any data points falling within the closed shape are grouped as part of the same population and are distinguished from data points falling outside the closed shape. As can be appreciated, any suitable closed shape can be provided, such as an ellipse, a polygon defined by a set of connected vertices, a quadrant or skewed quadrant, etc.

The gates provided as part of the training flow cytometry data are referred to as training gates in that they are taken to be correct/accurate and can therefore be relied upon for training purposes, e.g. as a starting point when interpolating gate configurations for new samples. The training gates can, for example, correspond to gates that were previously drawn manually by a user skilled in flow cytometry analysis, or gates that were generated automatically and otherwise validated, adjusted and/or confirmed by a skilled user, such as gates from development data or gates used as part of one or more previously conducted studies or a previous clinical run.

As can be appreciated, the training flow cytometry data can include data from a plurality of different training samples. In some embodiments, the training samples can comprise samples of different cells or biological particles that manifest as different distributions of data points and corresponding gate configurations from one training sample to another. In some embodiments, at least some of the training samples can correspond to samples of similar biological particles, such that the distribution of datapoints and corresponding gate configurations are similar, but not identical, from one training sample to another.

The method 100 can further include a step of providing target flow cytometry data corresponding to a target sample. The target flow cytometry data can comprise a plurality of data points.

The target sample can correspond to a sample where cells/particles were measured using a flow cytometer. The target flow cytometry data can include data points corresponding to measurements of the target sample as acquired via a flow cytometer. Each data point can correspond to measurements of an individual cell/particle that has passed through the one or more lasers of the flow cytometer. Such data points can be provided in a data file and/or table, and can be plotted for visualization/analysis, for example on a one- or two-dimensional histogram, and/or two- or three-dimensional dot or scatter plots.

The target sample can correspond to a sample whose data has not yet been gated/analyzed. For example, the target sample can be a sample that is different than any of the provided training samples, such that the training flow cytometry data is different than the target flow cytometry data. As can be appreciated, the target flow cytometry data can be provided without any gates. Accordingly, subsequent steps in the method are directed to automatically generating/proposing gates that can be applied to the target flow cytometry data to accurately and meaningfully isolate populations of datapoints contained therein.

A subsequent step of method 100 can include generating images of the data points of the samples 103, including generating an image of the data points for the target sample 103b, and generating images of the data points for each of the training samples 103a. As can be appreciated, the training and target flow cytometry data is provided as data points in the form of a data file and/or table. Accordingly, generating an image comprises rasterizing a plot of the data points, and/or otherwise converting the plot of the data points into a digital image represented via pixels. Distinct images can be created for the data points of the target sample, and for the data points of each of the training samples. Moreover, the images for each of the target and training samples can be generated with the same resolution and/or dimensions. For example, the images of data points for all the target and training samples can be a square having N×N pixels, or a rectangle having M×N pixels. In some embodiments, the axes of the plots represented in the images can be scaled such that the images for all the target and training samples visualize the same range of data.

Figure 2:
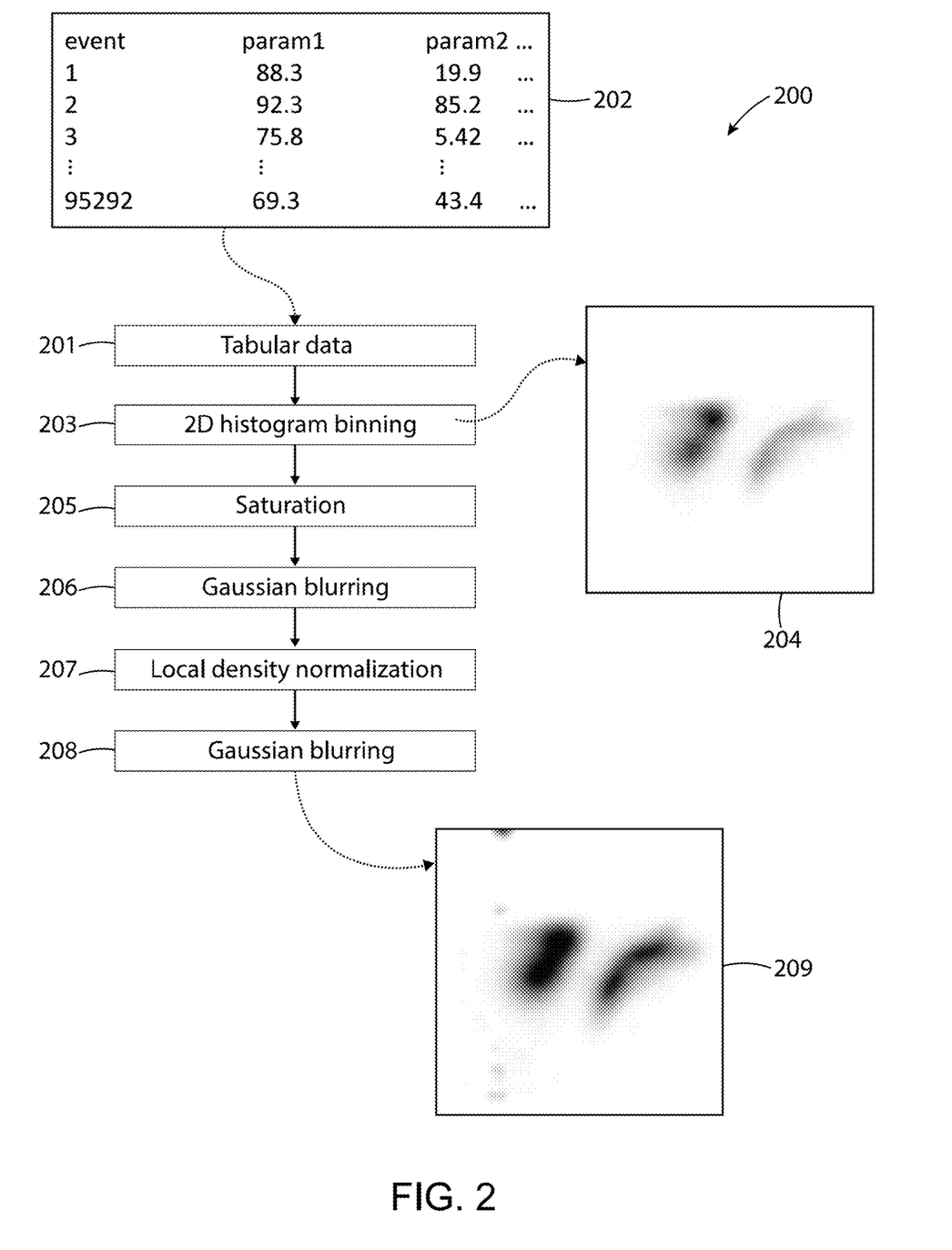
FIG. 2 is a flowchart illustrating a subprocess for generating an image of data points in sample of flow cytometry data, according to an embodiment.

As can be appreciated, any suitable technique can be used to generate the images of data points for the target and training samples. By way of example, an exemplary subprocess 200 for generating an image of data points is shown in FIG. 2. The exemplary process described the generating of an image in the form of a two-dimensional histogram, but it is appreciated that other suitable techniques can be applied to generate images of different types of plots such as dot plots, scatter plots, etc.

A first step of the subprocess 200 can include receiving flow cytometry data to be plotted 201. In the illustrated embodiment, the flow cytometry data is received in tabular form 202, with each row corresponding to a data point (labelled as an "event") comprising a plurality of measured channels represented in columns. In the illustrated embodiment, two columns are shown which respectively include measurements of a first channel ("param1") and a second channel ("param2") for each data point, but it is appreciated that the flow cytometry data can include measurements of other channels as well.

A second step of the subprocess 200 can comprise binning the data points 203. The process of binning the data points can include converting the data points into a data structure in which data points having measurements with continuous values are assigned to discrete values. For example, a plurality of "bins" can be defined with each bin corresponding to a respective range of values for a given channel (or combination of channels in the case of multi-dimensional binning). The range of each bin can be non-overlapping and can together span all possible values for the data points of the given channel (or combination of channels). Each data point can be assigned to a bin based on the range in which the value of its measurement for the binned channel falls. Each bin can then be assigned a value based on the data points that fall within that bin. In some configurations, the value assigned to the bin can correspond to the number of data points that fall within that bin. In other configurations, such as where the data points comprise additional channels that are not binned channels (i.e., additional dimensions that do not correspond to binned dimensions), the value of the bin can correspond to a summary of one or more additional channels for the data points in the bin, for example using a mathematical summary metric obtained by arithmetic mean, median, geometric mean, singular value decomposition, principle component analysis, or other suitable metric.

In the illustrated embodiment, two-dimensional binning is carried out such that the data points can be represented in an image as a two-dimensional histogram 204. In particular, the data points are binned along two channel dimensions (i.e., param1 in an X dimension and param2 in a Y dimension), and the bins are represented on a plot along X and Y axes. In the present embodiment, the X and Y axes each span N pixels, such that the image is square with a resolution of N×N pixels, with each pixel representing a bin. It is appreciated that in other configurations the image need not be square, and can have a resolution of N×M pixels, for example. Each pixel can be assigned a shade based on the value of its corresponding bin. In the present embodiment, the image is provided in grayscale, and the tone of the pixel represents the value of the bin, for example a darker tone representing bins having more data points contained therein. It is appreciated, however, that other configurations are possible.

Following the generating of image 204 via binning, image processing steps can be carried out to refine the image and/or make the image more suitable for subsequent processing. As an example, in the present embodiment, a sequence of image processing steps is carried out including saturating the image based on a percentile of the pixel intensities 205, applying a first Gaussian blurring 206, applying local density normalization 207, and applying a second Gaussian blurring 208. It is appreciated that a different sequence and/or combination of image processing techniques can be used in other embodiments. The result is an output image 209 that can be used in subsequent steps of the method 100. As can be appreciated, for a training sample, the pixels included in output image 209 can encode the data points of the training sample without encoding training gates associated with the sample. Instead, the training gates can be rendered and/or rasterized separately, and layered on top of the pixels of output image 209 without being integrated therein.

Referring back to FIG. 1, once images of the data points of the training and target samples are generated, a subsequent step 104 can include selecting a training sample that most closely resembles the target sample. For example, the image of the target sample can be compared with the images of each training sample in order to calculate a similarity score for each training sample. The training sample having a highest similarity score can then be selected as most closely resembling the target sample.

In the present embodiment, the pixels of the target and training sample images are processed in order to calculate the similarity score. Specifically, the pixels encoding the data points of the target sample are compared with the pixels encoding the data points of each training sample, such that similarities in the arrangement of the pixels (i.e., shapes, structures, patterns, etc.) between training and target sample images can be quantified. As can be appreciated, any suitable numerical method and/or image processing technique can be used to process the pixels and calculate similarity scores. For example, in the present embodiment, a nearest-neighbor search of the image pixel data is carried out to calculate an overall similarity score between the image of the target sample and the images of each of the training samples. More specifically, the nearest-neighbor algorithm can involve visiting all possible neighbors (in the present case, each training sample image), and comparing the target image to it to calculate a "distance" metric. The neighbor (i.e. the training sample image) having the nearest distance can then be selected. In the present embodiment, the distance metric used is the Euclidean distance from all pixels, but it is appreciated that other suitable distance metrics can be used. In some embodiments, the images can be preprocessed before carrying out the search. For example, prior to the nearest-neighbor search, the size of the images can be reduced (e.g., by reducing the resolution of the images by a specified factor and/or to a specified size) to allow speeding up the calculation and/or to allow reducing distances due to very small positional shifts. As another example, in some embodiments, the preprocessing can include normalizing the images (i.e. pixel vectors) by their L2-norm. It is appreciated, however, that other suitable techniques can be used as well.

The nearest-neighbor search described above is used as a heuristic to pre-select, from the training samples, a given training sample that a user would have gated as similar as possible to how they would have gated the target sample. It is appreciated that other techniques can be used to do a similar type of heuristic, for example by training a corresponding machine learning model. In some embodiments, for example where large numbers of training samples are processed, an approximated nearest-neighbor search can be used. In such embodiments, a locality-sensitive hash or a locality-preserving hash can be used to effectively reduce the size of the search vectors (i.e. training sample images).

Figure 6:
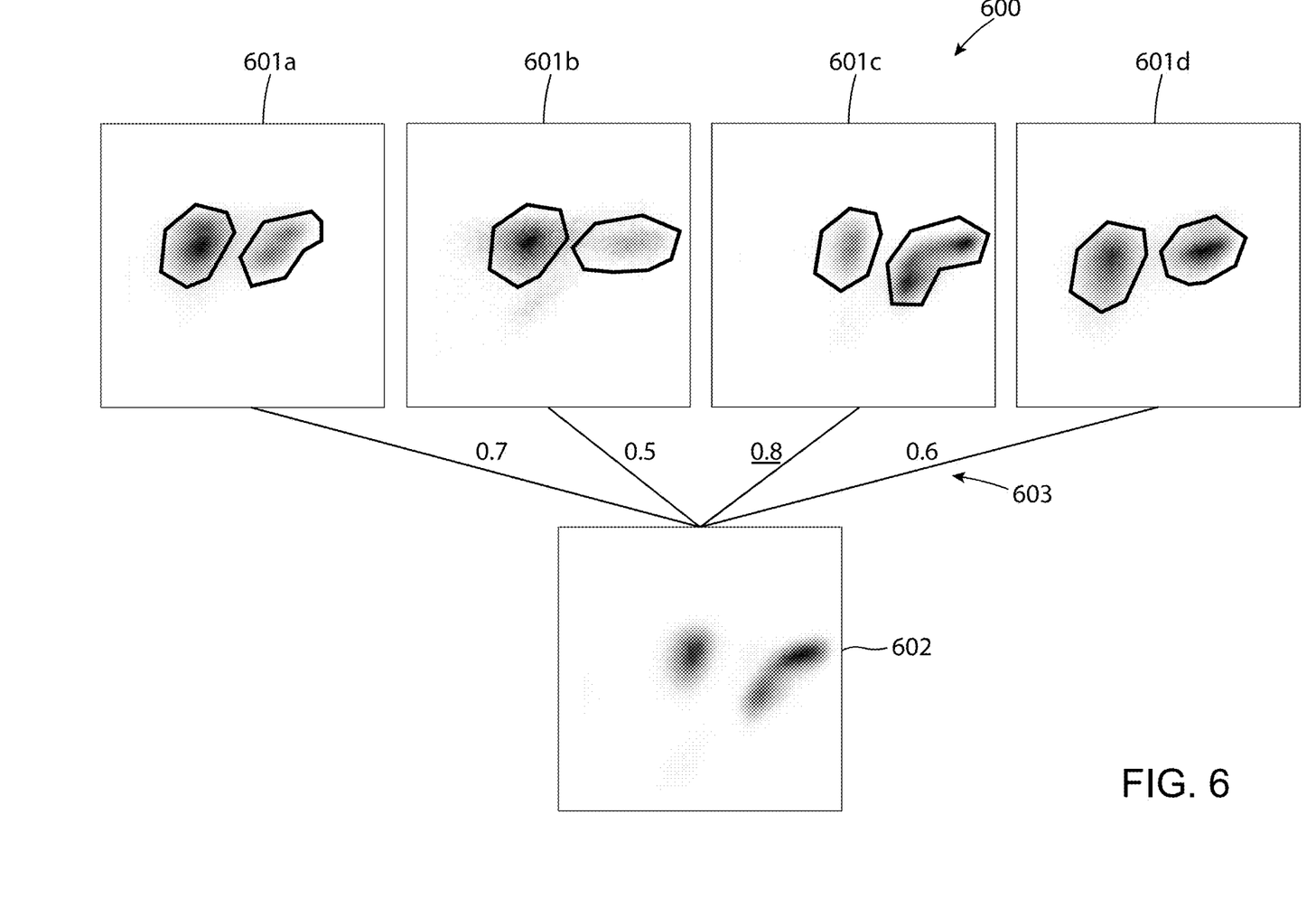
FIG. 6 is a schematic illustrating a subprocess for selecting a training sample from a plurality of training samples, according to an embodiment.

By way of example, and with reference to FIG. 6, an exemplary subprocess 600 for selecting a training sample is shown according to an embodiment. In the illustrated example, a plurality of images of training samples 601a, 601b, 601c, 601d is provided, along with an image of a target sample 602. The image of the target sample 602 is compared with images of each training sample 601a, 601b, 601c, 601d, such that a corresponding similarity score 603 is calculated for each training sample. The similarity score is calculated using a nearest-neighbour search of the image pixel data, whereby the calculated score falls in a range between 0 and 1, where 0 is least similar and 1 is most similar. In this example, training sample 601c is calculated as having a similarity score of 0.8 which is the highest similarity score of all the training samples. Training sample 601c is thus selected as most closely resembling the target sample 602.

Returning to FIG. 1, once a training sample is selected, a subsequent step 105 can include calculating a transformation to morph between the image of the selected training sample and the image of the target sample. In the present embodiment, a transformation that morphs from the image of the selected training sample into the image of the target sample is calculated, but it is appreciated that in other embodiments the inverse can be calculated, i.e., a transformation that morphs from the image of the target sample into the image of the selected training sample.

As can be appreciated, any suitable image registration technique can be applied to calculate the transformation between the target and training sample images. The transformation can use a non-rigid, deformable registration algorithm that produces a transformation vector field. As an example, the transformation can be based on Thirion's "demons" algorithm, as described in Thirion, J. P., Image matching as a diffusion process: an analogy with Maxwell's demons, Medical Image Analysis 2(3), 243-260 (1998), the entirety of which is incorporated herein by reference. Such an algorithm estimates nonrigid deformations by successively estimating force vectors that drive the deformation toward alignment, and then smoothing the force vectors by convolution with a Gaussian kernel. In some embodiments, smoothing applied to the transformation field during each iteration of the algorithm can be specified. For example, a user can be solicited for an input to specify a value of the smoothing to be applied, and such smoothing value can be applied for all iterations. In some embodiments, the transformation can be based on the finite element method. In such embodiments, the images can be subdivided into finite elements, for example by applying spatial discretization to convert the images into meshes comprising a finite number of points and applying the transformation algorithm to such points.

In some configurations, the images of the data points of target and training samples can comprise additional channels that reflect those other than the ones used for two-dimensional histogram binning. The pixel values of the images can summarize the intensity of each additional channel for the datapoints in each two-dimensional histogram bin. In such configurations, when calculating the transformation, for example when using Thirion's "demons" algorithm, the magnitude and direction of the image gradient of multiple channels can be calculated by taking the square root or direction, respectively, of the largest eigenvalue of $J^T J$, where J is the Jacobian matrix comprised of the gradients of each channel.

In some configurations, landmarks can be used to assist in guiding the image registration algorithm. In particular, a landmark can be specified or identified in the target sample image, and a corresponding landmark can be specified or identified in the training sample image. Such landmarks can be understood to be corresponding features in each of the target and sample images, and can be taken into account by the registration algorithm such that the resulting transformation ensures that the landmarks are sufficiently aligned following the transformation. In some embodiments, the landmarks can be identified automatically, for example using image pre-processing techniques configured to recognize or extract predefined salient features in the images. In some embodiments, the landmarks can be specified manually, for example by soliciting a user input to specify corresponding points and/or regions in each of the target and sample images prior to running the registration algorithm. In some embodiments, landmarks that are defined automatically can be manually confirmed, corrected and/or refined via a user input prior to running the registration algorithm.

In some embodiments, calculating the transformation can include calculating an improvement score that qualifies an improvement effected by the transformation. As an example, the improvement can be calculated as the difference in a similarity score between the target sample and untransformed training sample, and between the target sample and transformed training sample. The similarity score can, for example, be the Pearson correlation coefficient of the pairwise pixels of the two images. It is appreciated, however, that other suitable techniques can be used to quantify the improvement of the transformation, and/or to quantify a similarity or correlation between the transformed image of the selected training sample and the image of the target sample.

Once the transformation has been calculated, a subsequent step can include generating a gate (or gates) for the target sample. In the present embodiment, this can include applying a transformation to the gate (or gates) of the selected training sample 106 and applying post-hoc correction 107, if needed.

In more detail now, step 106 can include copying a training gate from the training sample, and applying the transformation calculated in step 105 to the training gate in order to produce a transformed gate. Where the training sample includes a plurality of training gates, this can be repeated for each of the training gates to produce a plurality of transformed gates. As can be appreciated, where the transformation calculated in step 105 defines a morph from the training sample to the target sample, the same transformation can be applied to the training gate to produce a transformed gate that better accommodates the image of the target sample. However, where the transformation calculated in step 105 defines a morph from the target sample to the training sample, the inverse of the calculated transformation can be applied to the training gate to produce a transformed gate that better accommodates the image of the target sample.

Figure 5:
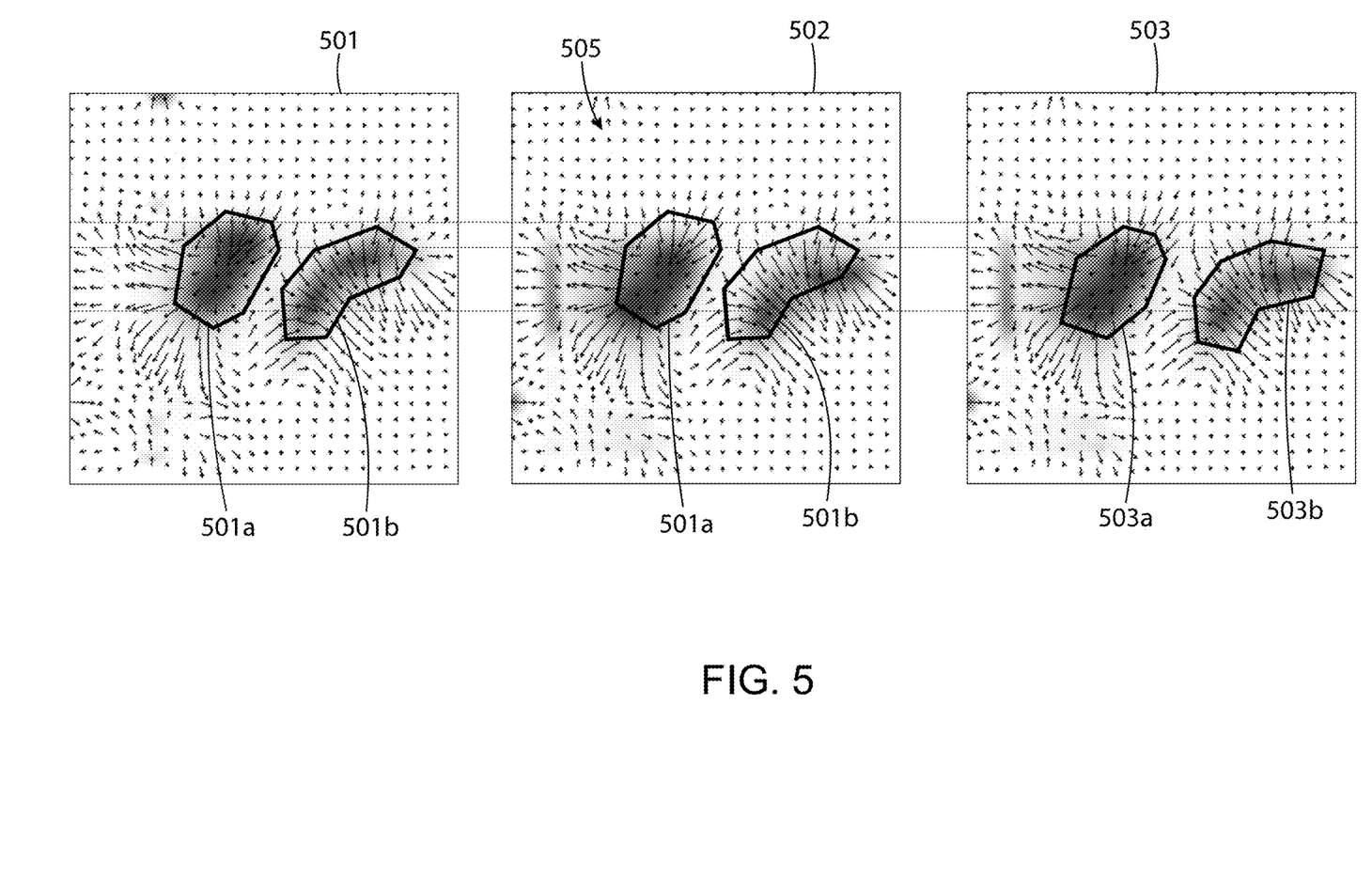
FIG. 5 is a schematic illustrating a process for transforming training gates, according to an embodiment.

By way of example, and with reference to FIG. 5, an exemplary transformation 500 of training gates is provided. In this example, an image of selected training sample 501 is shown, which includes two training gates 501a, 501b overlaid on the image of the training sample data points. An image of target sample 502 is shown, in which the training gates 501a, 501b are copied and overlaid on the image of target sample data points. For illustrative purposes a transformation field 505 is also overlaid on the images, the field 505 indicating the transformation that was calculated to morph from training sample image 501 to target sample image 502. Finally, an image of target sample 503 is shown, in which each of the training gates is transformed via the field 505 to produce transformed gates 503a, 503b that better accommodate the target sample data points.

In the illustrated example, the training gates 501a, 501b are polygons defined by a plurality of connected vertices. Accordingly, the training gates 501a, 501b are transformed by applying the calculated transformation to the vertices, thereby producing transformed vertices that may be displaced relative to the original vertices depending on the vectors defined in field 505. The transformed vertices can subsequently be reconnected to produce the transformed gates 503a, 503b.

Moreover, in the illustrated example, training gate 501a has 7 vertices that are transformed via field 505, whereas training gate 501b has 8 vertices that are transformed via field 505, to produce transformed gates 503a, 503b that also have 7 and 8 vertices, respectively. However, it is appreciated that higher-resolution transformations can be carried out. For example, in some embodiments, additional vertices can be added to the polygons defining training gates, for example along lines connecting existing vertices. The transformation can then be applied to a higher number of vertices, allowing for a more nuanced transformation. The resulting vertices can be connected to produce the transformed gates. In some embodiments, the vertices can be connected directly, whereas in other embodiments numerical methods can be applied to generate lines, curves and/or polygons that best fit the transformed vertices.

As can be appreciated, different steps can be carried out as needed to transform training gates of different types and/or shapes. For example, a training gate defined by an ellipse can be transformed by sampling a plurality of points along the edges/border of the ellipse, and the sampled points can be transformed using the calculated transformation. The transformed gate can be produced by connecting the transformed points to define a polygon that approximates an ellipse. Alternatively, the transformed gate can be produced by generating a new bounding ellipse that is fit to the transformed points.

As another example, a training gate that is defined by a rectangle can be transformed by sampling a plurality of points along each edge/border of the rectangle, and the sampled points can be transformed using the calculated transformation. The transformed gate can be produced by generating a new rectangle, for example by taking the average X or Y of each vertical or horizontal edge's points, respectively, and weighted by the density at each point.

As a further example, a training gate that is defined as a quadrant having right-angles can be transformed by sampling a plurality of points on intersecting lines defining the edges/borders of the quadrant, and the sampled points can be transformed using the calculated transformation. The transformed gate can be produced by generating a new quadrant, for example by taking an average of each line's points, weighted by the density at each point.

As yet a further example, a training gate that is defined as a quadrant with non-right angles can be transformed by sampling a plurality of edge points on intersecting lines defining the edges/borders of the quadrant, and a center point where the lines intersect. The edge points and the center point can be transformed using the calculated transformation to produce transformed edge points and transformed center point. Candidate quadrant lines can be drawn for each of the transformed edge points, extending between the transformed edge point and the transformed center point. Finally, four intersecting quadrant line segments can be selected from the candidate quadrant lines by determining which candidate quadrant lines intersect with the fewest number of data points in the target sample.

Finally, it should be appreciated that gates defining ranges or a split in a one-dimensional histogram can be adjusted in a similar manner as described above for two-dimensional histograms. For example, the techniques described above can be applied to two-dimensional images where both the X and Y axes display the same single channel of the one-dimensional histogram.

Referring back to FIG. 1, step 107 can include automatically or manually (e.g.: via a user input) correcting the geometry of the transformed gates as needed, for example to respect one or more predetermined rules or requirements. In some embodiments, this can include adjusting the transformed gates to prevent overlaps between gates, and/or adjusting the transformed gates such that vertices that are outside the range of the training sample image are outside the range of the target sample image after the transformation.

Finally, after a transformed gate has been generated and adjusted, it can be proposed as a target sample gate. The target sample gate can be output to a user, along with its corresponding improvement score, in step 108. As can be appreciated, depending on the improvement score, the target sample gate can be retained and applied to isolate a population of data points in the target sample as part of a study, or it can be subject to further adjustment or refinement. For example, in some embodiments, if the improvement score is above a predetermined threshold, the target sample gate can be automatically retained and/or visually indicated to a user as being of sufficient quality. If the improvement score is below a predetermined threshold, the target sample gate can be automatically rejected and/or flagged for manual review by providing a visual indication to the user. When the gate is flagged for manual review, a user can be solicited for an input in order to confirm the quality of the gate and/or manually adjust the geometry of the proposed target sample gate. In some embodiments, when a user manually confirms the quality of a proposed gate and/or manually provides input to adjust the geometry of a proposed gate, the resulting gate and corresponding data can be retained as a new training sample and stored as part of the training dataset for subsequent iterations of the automatic gating method.

In some embodiments, prior to outputting the transformed gate as a target sample gate in 108, additional verifications can be carried out to determine whether the untransformed training gate is likely a better quality gate for the target sample data, such that the untransformed training gate can be output as a proposed target sample gate instead of the transformed gate. By way of example, with reference to FIG. 3, a subprocess 300 for pre-validating transformed gate quality is shown according to an embodiment. In the illustrated embodiment, a first verification can be carried out upon receiving a target sample and selecting a most similar training sample 301, for example following step 104 of method 100 described above. The first verification can include making a determination 302 based on the number of data points (e.g., cells) included in the target sample. If the number of data points in the target sample is below a predetermined threshold, such as a user-defined threshold, the untransformed training gate can be output as a proposed target sample gate 303. In other words, the geometry of the training gate can be copied without transformation, effectively skipping steps 105-107 of method 100. If the number of data points in the target sample is above the predetermined threshold, the training gate and/or training image can be transformed 304, for example according steps 105-107 of method 100.

Figure 3:
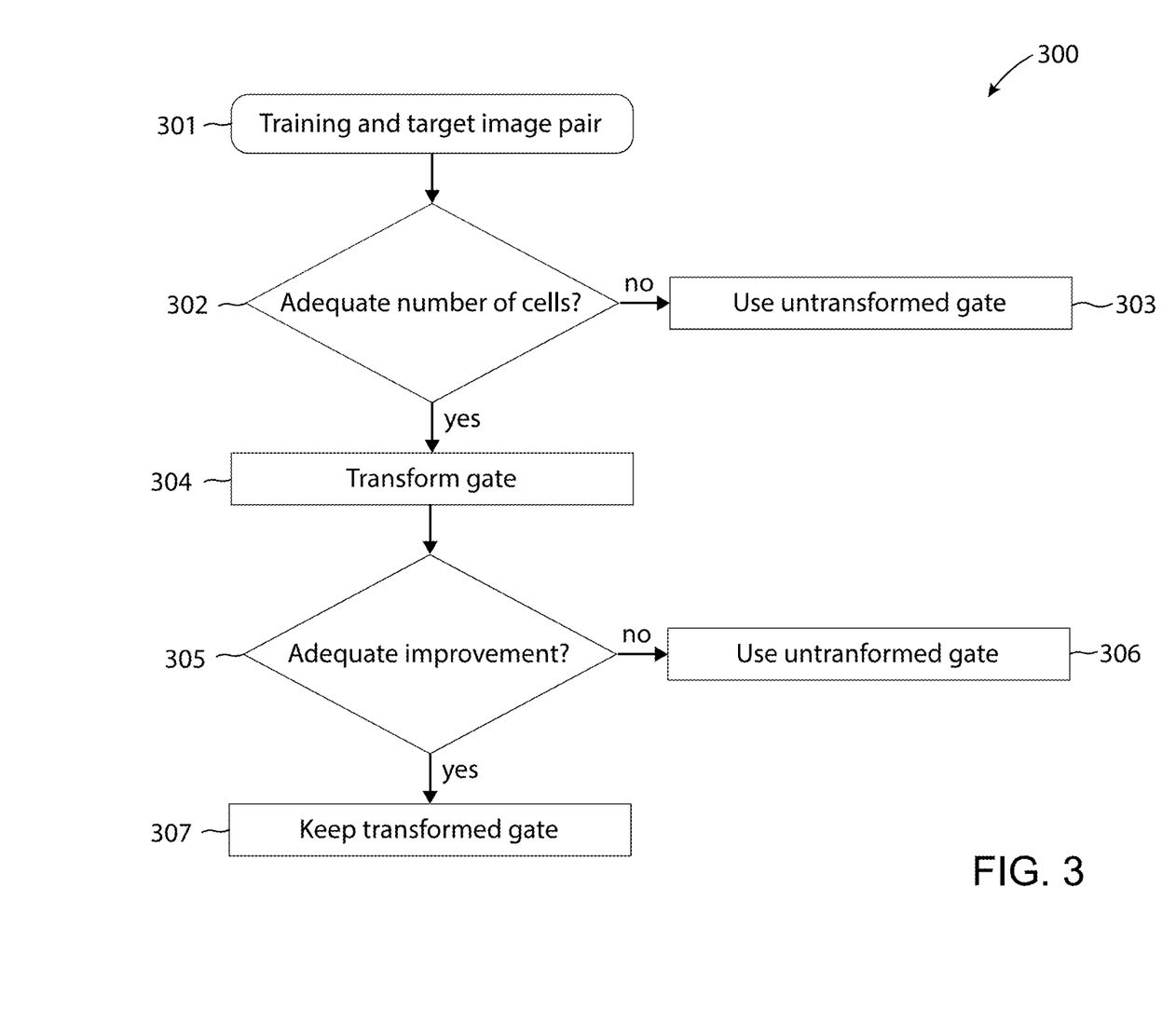
FIG. 3 is a flowchart illustrating a subprocess for pre-validating transformed gate quality, according to an embodiment.

In the illustrated subprocess 300, a second verification can be carried out following calculation of improvement score in step 105 or following the generating of transformed gate in steps 106 and/or 107. The second verification can include making a determination 305 based on the improvement score that qualifies the improvement effected by the transformation of the image of the selected training sample. If the improvement score is below a predetermined threshold, such as a user-defined threshold, the untransformed training gate can be output as a proposed target sample gate 306. In other words, the geometry of the training gate can be copied without transformation. If the improvement score is above a predetermined threshold, the transformed training gate can be output as a proposed target sample gate 307. If the training gate has already been transformed, it can be output as part of step 108. If the training gate has not yet been transformed, the remainder of steps 105-107 can be carried out as usual to generate the transformed training gate, prior to outputting the transformed gate as part of step 108.

Figure 4:
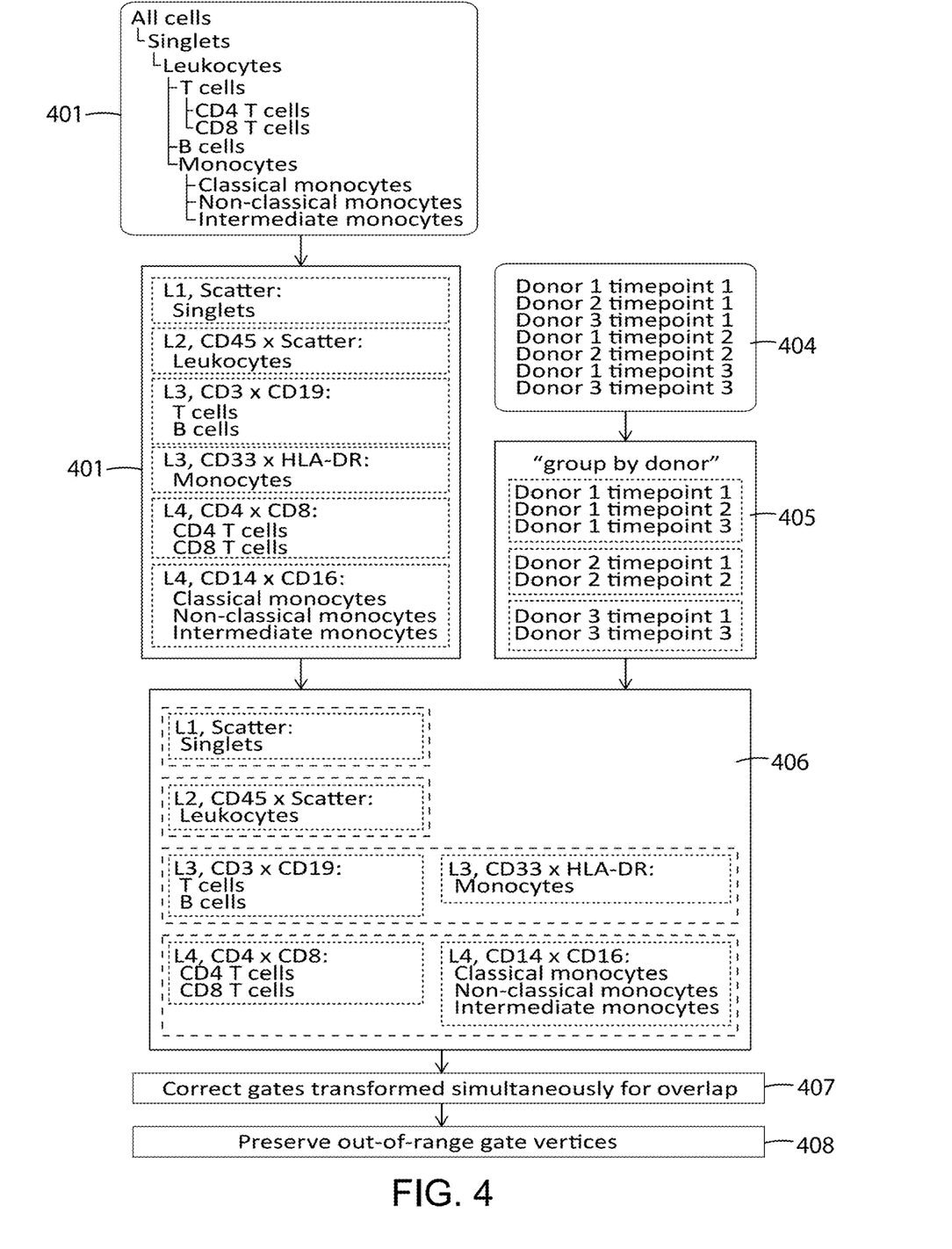
FIG. 4 is a flowchart illustrating parallelization of a method for automatic gating in flow cytometry, according to an embodiment.

One skilled in the art will appreciate that the steps of method 100 can be parallelized, such that a plurality of target samples can be processed in parallel and/or such that a plurality of gates for a given target sample can be transformed simultaneously. With reference to FIG. 4, an analysis of flow cytometry data of a target sample can involve a plurality of gates organised in a hierarchy 401 to facilitate comparisons of cellular subsets (for example, as identified by the expression or lack of expression of one or more known surface/intracellular markers). Such gates can be grouped hierarchically and by axes 402. Similarly, a study can include a plurality of target samples 404, such as samples from a plurality of donors at a plurality of timepoints. Such samples can be processed individually, or can be grouped by donor 405 and/or according to a user-provided input whereby all samples in the group then utilize the same gate geometry to yield a consistent transformation for all samples in a group. Parallel processing can then be carried out 406 by processing each sample or sample group in parallel. For each sample/group, a hierarchy of gates can be processed in hierarchical order, whereby gates using the same axes and parent population can be processed together. Additionally, all such groups of gates whose hierarchical ancestors have been processed can be processed in parallel. Following the parallelized processing of gates and/or sample groups 406, gates that were transformed simultaneously can be corrected for overlap 407, and gates can be adjusted to preserve out-of-range gate vertices 408, for example as described in connection with step 107.

Figure 7:
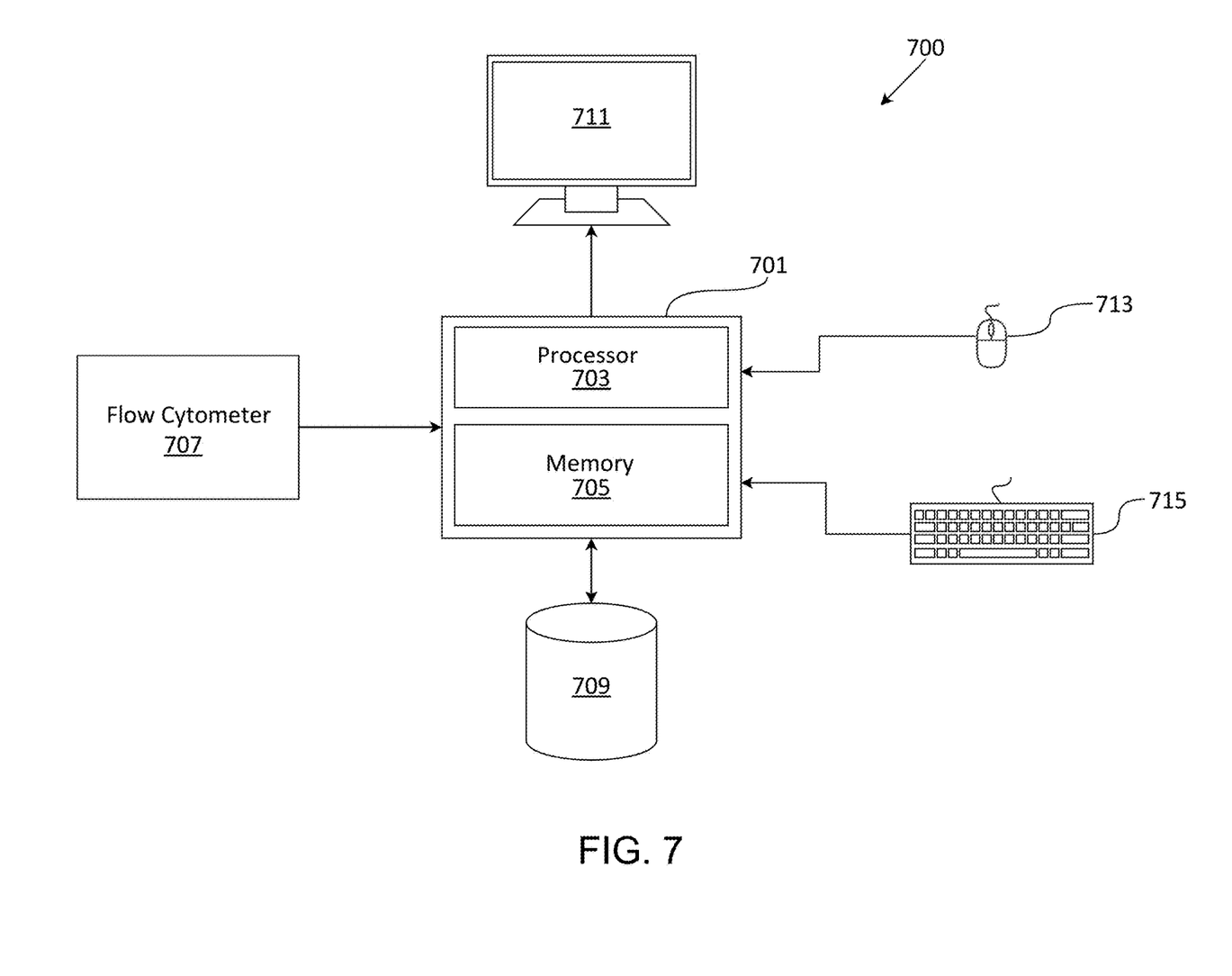
FIG. 7 is a schematic illustrating a system for automatic gating in flow cytometry, according to an embodiment.

In an embodiment, at least some steps of the above-described method 100 can be carried out on a computing system. With reference to FIG. 7, an exemplary system 700 for automatic gating in cytometry is shown according to an embodiment. In the illustrated embodiment, the system 700 includes a computing system 701 having a processor 703 and memory 705. The computing system can, for example be a laptop or desktop computer, among others. The computing system 701 is in operational communication with: a flow cytometry system that includes a flow cytometer 707 (for example by being configured to have access to data acquired by flow cutometer, such as data uploaded to a database via a web application); persistent storage 709 (such as local storage and/or a remote database); and user input/output devices such as a display 711 (including a touch-enabled display), a mouse 713 and/or keyboard 715. The memory 705 stores instructions which, when executed by the processor 703 can cause the processor to: receive cytometry data of a target sample from flow cytometer 707, receive training cytometry data from persistent storage 709; generate an image of the data points for the target sample; generate images of the data points for a plurality of training samples; select a training sample based on a similarity between the image of the selected training sample and the image of the target sample; calculate a transformation required to morph between the image of the selected training sample and the image of the target sample; automatically generate a target sample gate by applying the calculated transformation to the training gate associated with the selected training sample; and/or any of the other steps processes/subprocesses discussed in connection with method 100 described above. The computing system 701 can solicit user input, for example, by causing a visual prompt to be shown on display 711, and can receive user input via a user input device such as the mouse 713, keyboard 715 and/or touch-enabled display 711. It is appreciated that other suitable configurations of system 700 are also possible.

In the foregoing specification, specific embodiments have been described. However, one of ordinary skill in the art appreciates that various modifications and changes can be made without departing from the scope of the invention as set forth in the claims below. Accordingly, the specification and FIGS. are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for automatically adjusting gates to cytometry data of a target sample comprising a plurality of target data points, comprising:
receiving training cytometry data corresponding to a plurality of training samples, the training cytometry data comprising, for each training sample, a plurality of training data points and at least one training gate isolating at least one population of the training data points;
generating an image of the target sample representing the target data points as a density plot;
generating images of the plurality of training samples, each image representing the training data points of a given training sample as a density plot;
selecting a training sample from the plurality of training samples based on a similarity between an arrangement of pixels in the density plots of the training samples and an arrangement of pixels in the density plot of the target sample;
calculating a transformation required to morph between the image of the selected training sample and the image of the target sample; and
generating a target sample gate by applying the calculated transformation to the training gate associated with the selected training sample.

2. The method according to claim 1, wherein the data points comprise a plurality of channels, and generating the images of the data points comprises: binning the data points in two dimensions corresponding to one or two channels of the plurality of channels; and generating an image representing the binned data points as a two-dimensional histogram.

3. The method according to claim 2, wherein generating the images further comprises at least one of: saturating the image based on a percentile of pixel intensities, Gaussian blurring and local density normalization.

4. The method according to claim 2, wherein the data points comprise additional channels other than the one or two channels used to bin the data points, and generating the images comprises calculating a mathematical summary metric summarizing an intensity of the additional channels, and representing the binned data points using pixels shaded to represent the calculated mathematical summary metric for each bin.

5. The method according to claim 1, wherein the training sample is selected from the plurality of training samples using a nearest-neighbor search of pixel data from the image of the target sample and the image of each training sample.

6. The method according to claim 1, wherein calculating the transformation comprises applying a non-rigid, deformable registration algorithm.

7. The method according to claim 6, wherein the deformable registration algorithm comprises Thirion's "demons" algorithm, and produces a transformation field.

8. The method according to claim 7, wherein the magnitude and direction of the image gradient of multiple channels is calculated by taking the square root or direction, respectively, of the largest eigenvalue of $J^T J$, where J is the Jacobian matrix comprised of the gradients of each channel.

9. The method according to claim 7, wherein the user can specify the smoothing applied to the transformation field during each iteration of the algorithm.

10. The method according to claim 1, further comprising calculating an improvement score indicating an improvement effected by the calculated transformation.

11. The method according to claim 10, wherein calculating the improvement score comprises applying the calculated transformation to the image of the selected training sample to produce a transformed image, and calculating a change between (1) the similarity between the image of the selected training sample and the image of the target sample and (2) a similarity between the transformed image and the image of the target sample.

12. The method according to claim 10, wherein if the improvement score is below a predetermined threshold, generating the target sample gate comprises copying a geometry of the training gate associated with the selected training sample, without transformation.

13. The method according to claim 1, comprising determining a quantity of target data points comprised in the target sample and, if the quantity of target data points is below a predetermined threshold, generating the target sample gate comprises copying a geometry of the training gate associated with the selected training sample, without transformation.

14. The method according to claim 1, wherein generating the target sample gate comprises further adjusting the target sample gate after transformation to correct for overlaps with other gates.

15. The method according to claim 1, wherein generating the target sample gate comprises adjusting a geometry of the target sample gate to keep gate vertices that are outside of a display range of the image of the training sample, outside of a display range of the image of the target sample.

16. The method according to claim 1, wherein the training gate is a polygon having edges defined by a plurality of connected vertices, and generating the target sample gate comprises adding vertices along the edges of the training gate prior to applying the calculated transformation, to allow for a higher-resolution transformation.

17. The method according to claim 1, wherein the training gate comprises a shape of a given type that is defined by edges, and applying the calculated transformation comprises: sampling a plurality of points along the edges;

transforming the points using the calculated transformation; and generating a new shape of the same type that fits the transformed points.

18. The method according to claim 1, further comprising receiving a user input to adjust or confirm a geometry of the target sample gate, and storing the adjusted or confirmed target sample gate as a new training sample for use as part of the training cytometry data in subsequent iterations of the method.

19. The method according to claim 1, wherein gates of a plurality of target samples are automatically adjusted in parallel, the method comprising at least one of:
   grouping the plurality of target samples according to a user input, and automatically adjusting the gates by group, yielding identical gate geometry for all target samples within a group;
   automatically adjusting gates having same axes and parent population in parallel; and
   automatically adjusting a hierarchy of gates in hierarchical order.

20. A system for automatically adjusting gates to cytometry data of a target sample comprising a plurality of target data points, the system comprising a processor and memory having instructions stored thereon which, when executed, cause the processor to:
   receiving training cytometry data corresponding to a plurality of training samples, the training cytometry data comprising, for each training sample, a plurality of training data points and at least one training gate isolating at least one population of the training data points;
   generating an image of the target sample representing the target data points as a density plot;
   generating images of the plurality of training samples, each image representing the training data points of a given training sample as a density plot;
   selecting a training sample from the plurality of training samples based on a similarity between an arrangement of pixels in the density plots of the training samples and an arrangement of pixels in the density plot of the target sample;
   calculating a transformation required to morph between the image of the selected training sample and the image of the target sample; and
   generating a target sample gate by applying the calculated transformation to the training gate associated with the selected training sample.

21. A non-transitory computer-readable medium having instructions stored thereon which, when executed, cause a processor to carry out a method for automatically adjusting gates to cytometry data of a target sample comprising a plurality of target data points, the method comprising:
   receiving training cytometry data corresponding to a plurality of training samples, the training cytometry data comprising, for each training sample, a plurality of training data points and at least one training gate isolating at least one population of the training data points;
   generating an image of the target sample representing the target data points as a density plot;
   generating images of the plurality of training samples, each image representing the training data points of a given training sample as a density plot;
   selecting a training sample from the plurality of training samples based on a similarity between an arrangement of pixels in the density plots of the training samples and an arrangement of pixels in the density plot of the target sample;
   calculating a transformation required to morph between the image of the selected training sample and the image of the target sample; and
   generating a target sample gate by applying the calculated transformation to the training gate associated with the selected training sample.

* * * * *